Dec. 4, 1951  K. H. MEULLER ET AL  2,577,262
SPHERICAL BORE GAUGE

Filed March 10, 1947  2 SHEETS—SHEET 1

INVENTORS
KARL HELGE MEULLER
HILDING VALDEMAR TÖRNEBOHM
BY THEIR ATTORNEYS
Howson & Howson Dec. 4, 1951  K. H. MEULLER ET AL  2,577,262
SPHERICAL BORE GAUGE Filed March 10, 1947  2 SHEETS—SHEET 2

INVENTORS
KARL HELGE MEULLER
HILDING VALDEMAR TÖRNEBOHM
BY THEIR ATTORNEYS

Howson & Howson

Patented Dec. 4, 1951

2,577,262

UNITED STATES PATENT OFFICE 2,577,262

SPHERICAL BORE GAUGE

Karl Helge Meuller and Hilding Valdemar Törnebohm, Goteborg, Sweden, assignors to Aktiebolaget Svenska Kullagerfabriken, Goteborg, Sweden, a corporation of Sweden Application March 10, 1947, Serial No. 733,650
In Sweden March 27, 1946

3 Claims. (Cl. 33—178)

The present invention relates to spherical bore gauges and has for its purpose to make such gauges suitable for use during the machining of a bore so that it will be possible to check the bore as it approaches its finished diameter.

Figure 1:
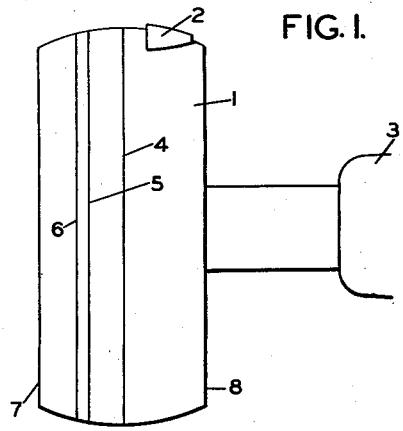
Figure 2:
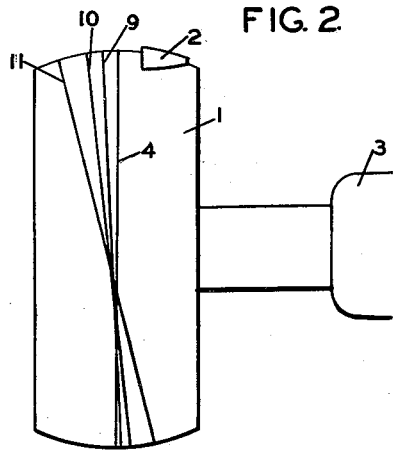
Figure 3:
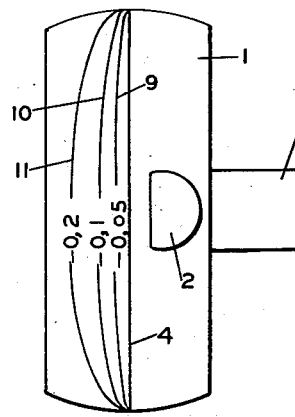
Figure 4:
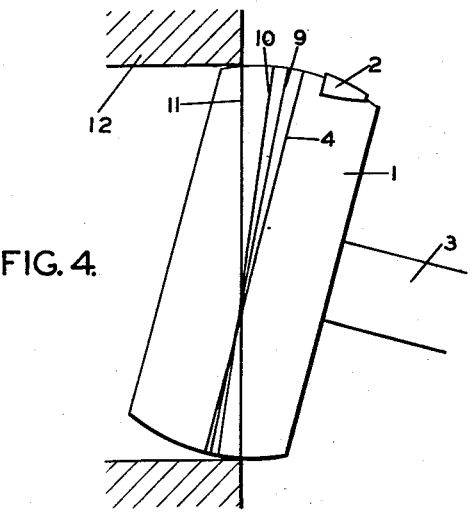
Figure 5:
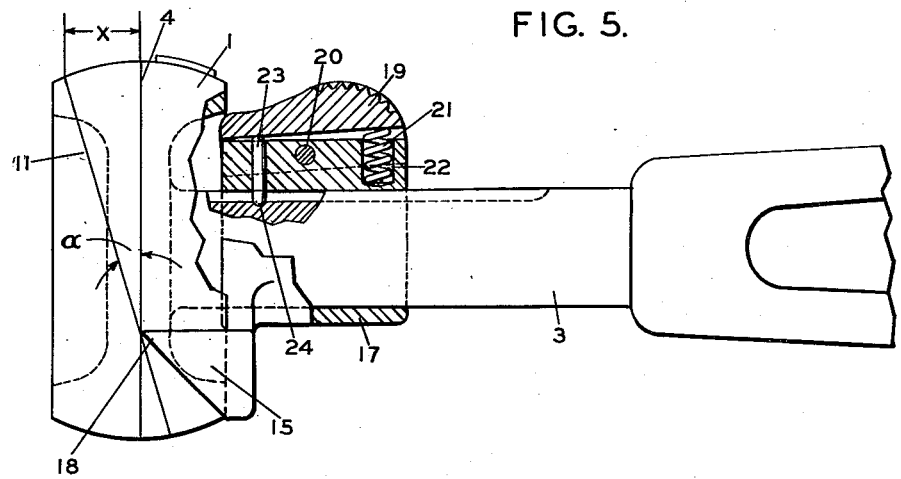
Figure 6:
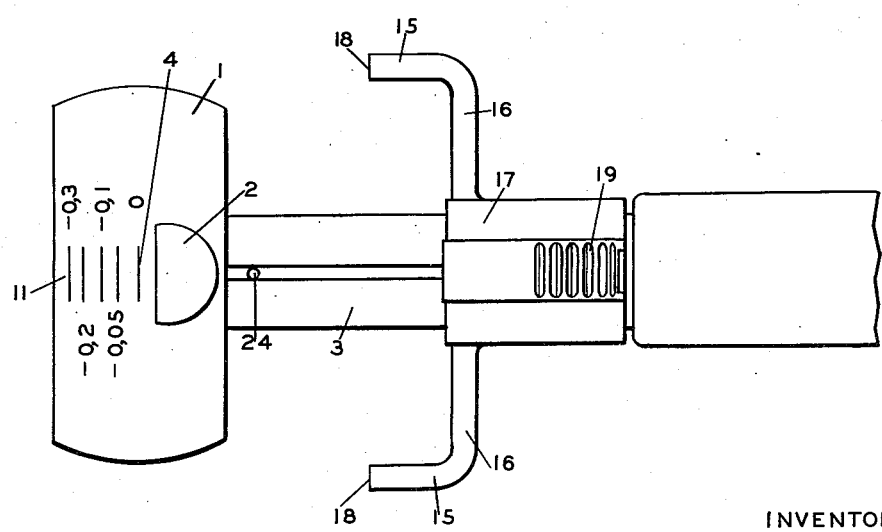

The invention is illustrated in the accompanying drawings in which Fig. 1 shows one embodiment of the invention. Figs. 2 and 3 show two views in relatively perpendicular planes of another embodiment of the invention. Fig. 4 illustrates the manner in which the gauge is used. Figs. 5 and 6 show two views of a gauge according to the invention having a support to facilitate its use.

The bore gauge illustrated in Fig. 1 has a gauge body 1 in the form of an equatorial spherical zone. On the body is a raised portion 2 forming the "not go" gauging surface. The body 1 is mounted on a handle 3. The diameter of the spherical zone corresponds to the low limit of the bore to be checked and the diameter from the surface of the raised portion to a diametrically opposed point on the spherical surface corresponds to the high limit of the bore. Both limits of the bore can be checked in one operation by merely tilting the gauge from one position to another. Gauges of this kind are available on the market and the above therefore forms no part of the present invention.

Gauges as described above have been suitable only for gauging finished bores. The present invention has for its purpose to extend their field of usefulness so that they can be used for checking a bore as it approaches its correct diameter during the machining operation. For this purpose the gauge body according to Fig. 1 is provided with three circular marks 4, 5 and 6 disposed parallel with each other. The mark 4 is an equatorial circle parallel with the end faces 7 and 8 of the gauge body. The mark 5 corresponds to a circle the diameter of which is less than the diameter of the equatorial circle by a desired amount, for instance 0.050 mm. The mark 6 corresponds to a circle whose diameter is less than that of the equatorial circle 4 by another desired amount, for instance 0.1 mm.

When the gauge is to be used it is brought into engagement with the edge of the bore and with its axis as nearly as possible coinciding with that of the bore. By observing the position of the marks relative to the end face of the work it is possible to estimate how far the machining of the bore has proceeded. If, for instance the gauge engages the work with that part of its surface located between its end face 7 and the mark 6 it is apparent that the bore of the work has not yet reached a diameter corresponding to the minimum diameter of the bore less 0.1 mm. If the gauge body engages the edge of the work formed at the meeting of the bore with the end face just at the mark 4 it is apparent that the diameter of the bore is equal to the low limit.

When the machining has progressed to a bore diameter greater than the low limit less 0.1 mm. the edge of the bore will contact with the gauge between the marks 5 and 6. When the bore has been finished to a diameter greater than the low limit less 0.050 mm. the gauge will contact the work between the marks 4 and 5. The distance between the mark 4 and the circle along which the gauge contacts the work gives an indication of the amount of machining required to bring the bore to the desired dimension.

The height of the raised portion 2 and the distance between the marks 4, 5 and 6 is greatly exaggerated in Fig. 1. When the bore has reached a size so that the spherical gauge body can enter it the low limit has been passed and it is now possible to check the high limit by merely tilting the handle of the gauge upwards. If the projection 2 engages the wall of the bore the bore is within the prescribed limits but if it clears the wall the diameter of the bore is too large.

The form of the invention illustrated in Figs. 2 and 3 differs from the form in Fig. 1 in that the marks are oblique instead of being parallel with each other as in Fig. 1. The advantage hereof is that the distance between the marks where the reading is made can be made greater, whereby the marks can be more easily distinguished and it is also possible to apply numerals relating to the dimension indicated by each mark. As in the form of the invention illustrated in Fig. 1 the mark 4 follows the equatorial circle of the sphere and is parallel with the end faces of the body of the gauge. The marks 9, 10 and 11 follow circles the diameters of which are less than the low limit by certain predetermined values, for instance 0.05, 0.1 and 0.2 mm. By applying these marks obliquely relative to the mark 4 the distance between them at the top of the gauge can be made considerable, so that space can be obtained for applying the dimensional value indicated by the mark as shown in Fig. 3. In the example shown the distances from the mark 4 of the marks 9, 10 and 11 along the upper generatrix of the sphere have been made proportional to the differences in size relative to the size represented by the mark 4.

Fig. 4 shows how the gauge is used. During the machining of the work 12 the bore is checked by applying the gauge to the work in the position shown in Fig. 4. In other words the gauge is held tilted so that the mark 11 is parallel with the edge of the bore. It is then observed whether or not the mark 11 enters the bore. When the bore is large enough to permit the mark 11 to enter the bore entirely, the angle of the gauge is altered so that the mark 10 will be parallel with the edge of the bore. When the diameter of the bore has become greater than the diameter corresponding to the mark 10 the gauge is held so that the mark 9 is parallel with the edge of the bore. When the bore has increased over the diameter corresponding to the mark 9 the gauge is held in the ordinary manner and by observing how much remains before the mark 4 can enter the bore it is possible to judge how much more machining is required until the bore reaches the required low limit. When the gauge body can enter the bore the high limit is checked by tilting the gauge in the manner described above in connection with Fig. 1.

The gauge illustrated in Figs. 5 and 6 is provided with a pair of rests for facilitating its use. The rests comprise a pair of triangular work engaging members 15 connected by means of bars 16 to a sleeve 17 surrounding the handle 3 of the gauge. The points 18 of the rests are located on the plane of the equatorial circle 4 having a diameter D. The distance X, which is the distance from the equatorial circle to the graduation on the scale representing the smallest value, for instance D—0.3 mm., is chosen so that the mark will be located at a suitable distance from the edge of the gauge body. The greater the distance X the larger will be the scale of the graduations and the easier will it be to make the reading. The angle $\alpha$ between the equatorial plane and the plane of the circle 11 representing the value D—0.3 and the position of the line of intersection between these two planes can be calculated mathematically. The points 18 should be located on this line of intersection. The position of the other graduations can then be calculated from these values, their respective planes intersecting the other planes at the above mentioned line of intersection.

The sleeve 17 is slidable on the handle 3. It is provided with a thumb grip 19 pivotable about a pin 20 in the sleeve. A spring 21 fitted in a socket 22 in the sleeve acts upon the thumb grip to tilt it about the pin 20 and to cause it to act upon another pin 23 slidable in the sleeve 17. The pin 23 engages with a depression 24 in the handle to lock the sleeve in position to maintain the points 18 in the position desired.

The gauge is used in the following manner. When the bore is approaching the desired diameter the gauge is inserted in the bore until the points 18 engage the face of the work piece and the gauge is tilted about these points until engagement with the edge of the bore is obtained as described in connection with the earlier figures after which the reading is made as before. When the bore has reached the low limit the thumb grip is pressed to release the pin 23 from the depression 24 and the sleeve 17 with the rests 15 is slid along the handle so that it will be out of the way as shown in Fig. 6 to permit the gauge to be inserted into the bore for use in the ordinary manner as described above.

The invention is not limited to the forms described above. The marks need not form complete circles but may be semicircles or other arcs of circles. Other kinds of marks may be used for facilitating the reading of the gauge to determine how far the work has progressed.

Having thus described our invention, we claim and desire to secure by Letters Patent:

1. A bore gauge having a gauge body comprising the equatorial zone of a sphere having on the surface thereof a number of marks, such as engraved lines or the like, for indicating dimensions less than the diameter of the sphere, said marks being applied obliquely to each other, and a pair of rests at opposite sides respectively of the gauge body and having aligned edges arranged for engagement with the end face of the work, said edges being located substantially on the line of intersection between the plane defined by the equatorial circle of the gauge body and the plane defined by the mark of least diameter.

2. A gauge according to claim 1 wherein the rests are displaceably connected to the gauge.

3. A tolerance bore gauge having a gauge body comprising the equatorial zone of a sphere and constituting the minimum gauge, a handle attached to said gauge body, there being a plurality of indicating marks applied to the surface of the said zone for indicating dimensions less than the diameter of the said equator of the zone, said marks being applied obliquely to each other, a portion raised above the surface of said zone and together with the opposed portion of the surface of the zone constituting the maximum gauge, said raised portion of the surface being wholly disposed upon the handle side of the equator of said zone, and a pair of rests are provided at opposite sides respectively of the gauge body having edges arranged for engagement with the end face of the work, said edges being located substantially on the line of intersection between the plane defined by the equatorial circle of the gauge body and the plane defined by the mark of least diameter, said rests being displaceably connected to the gauge.

KARL HELGE MEULLER.
HILDING VALDEMAR TÖRNEBOHM.

REFERENCES CITED

The following references are of record in the file of this patent:

UNITED STATES PATENTS

| Number | Name | Date |
|---|---|---|
| 1,206,202 | Bright | Nov. 28, 1916 |
| 1,664,535 | Bartholdy | Apr. 3, 1928 |
| 1,793,763 | Tornebohm | Feb. 24, 1931 |
| 2,200,885 | Johnson | May 14, 1940 |
| 2,298,597 | Sexton | Oct. 13, 1942 |
| 2,377,679 | Eckstein | June 5, 1945 |
| 2,454,159 | Graves | Nov. 16, 1948 |

FOREIGN PATENTS

| Number | Country | Date |
|---|---|---|
| 35,122 | Sweden | June 19, 1913 |
| 170,306 | Germany | May 4, 1906 |
| 633,638 | Germany | July 31, 1936 |
| 645,024 | Germany | Oct. 4, 1936 |